United States Patent

Caputi, Jr. et al.

[11] 3,961,007
[45] June 1, 1976

[54] CONTINUOUS PROCESS FOR MAKING FIBROUS CELLULOSE ACETATE FILTER MATERIAL

[75] Inventors: Arthur Caputi, Jr.; Thomas C. Wong, both of Modesto, Calif.

[73] Assignee: E & J Gallo Winery, Modesto, Calif.

[22] Filed: Oct. 23, 1973

[21] Appl. No.: 408,296

[52] U.S. Cl. .................................. 264/140; 264/11; 264/200
[51] Int. Cl.² ....................... D01D 5/26; D01F 2/28
[58] Field of Search ............... 264/86, 87, 349, 216, 264/200, 9, 11, 140; 106/187; 210/65

[56] References Cited
UNITED STATES PATENTS

| | | | |
|---|---|---|---|
| 2,145,076 | 1/1939 | Ehrenstein | 264/200 |
| 2,622,273 | 12/1952 | Detwiler | 264/141 |
| 3,042,970 | 7/1962 | Terenzi | 264/11 |
| 3,306,342 | 2/1967 | Di Salvo et al. | 264/12 |
| 3,420,245 | 1/1969 | Kiefer et al. | 260/227 |
| 3,441,473 | 4/1969 | Boundige et al. | 264/200 |
| 3,483,282 | 12/1969 | Manjikian | 106/187 |
| 3,573,158 | 3/1971 | Pall et al. | 210/505 |
| 3,615,024 | 10/1971 | Michaels | 210/490 |
| 3,666,508 | 5/1972 | Justice et al. | 106/187 |

*Primary Examiner*—Robert F. White
*Assistant Examiner*—James B. Lowe
*Attorney, Agent, or Firm*—Townsend and Townsend

[57] ABSTRACT

Fibrous cellulose acetate resembling asbestos in fibrous structure and liquid filtering properties which is useful for filtering potable liquids such as fruit juices, vegetable juices and wine is made continuously by introducing a stream of a 2–4% by weight solution of cellulose acetate of 25–45 secs. viscosity in acetone and a stream of water into a mixing T at velocities which create substantial turbulence and at a water:solution volume ratio of 4:1 to 20:1, continuously withdrawing the resulting cellulose acetate slurry from the mixing T and passing it through a mechanical shearer which shears the precipitate to a surface area in the range of 35-55 m²/g and thereafter depositing the slurry on a porous support to drain unabsorbed water-/acetone from the precipitate and washing the precipitate with water until it is substantially acetone-free.

11 Claims, 2 Drawing Figures

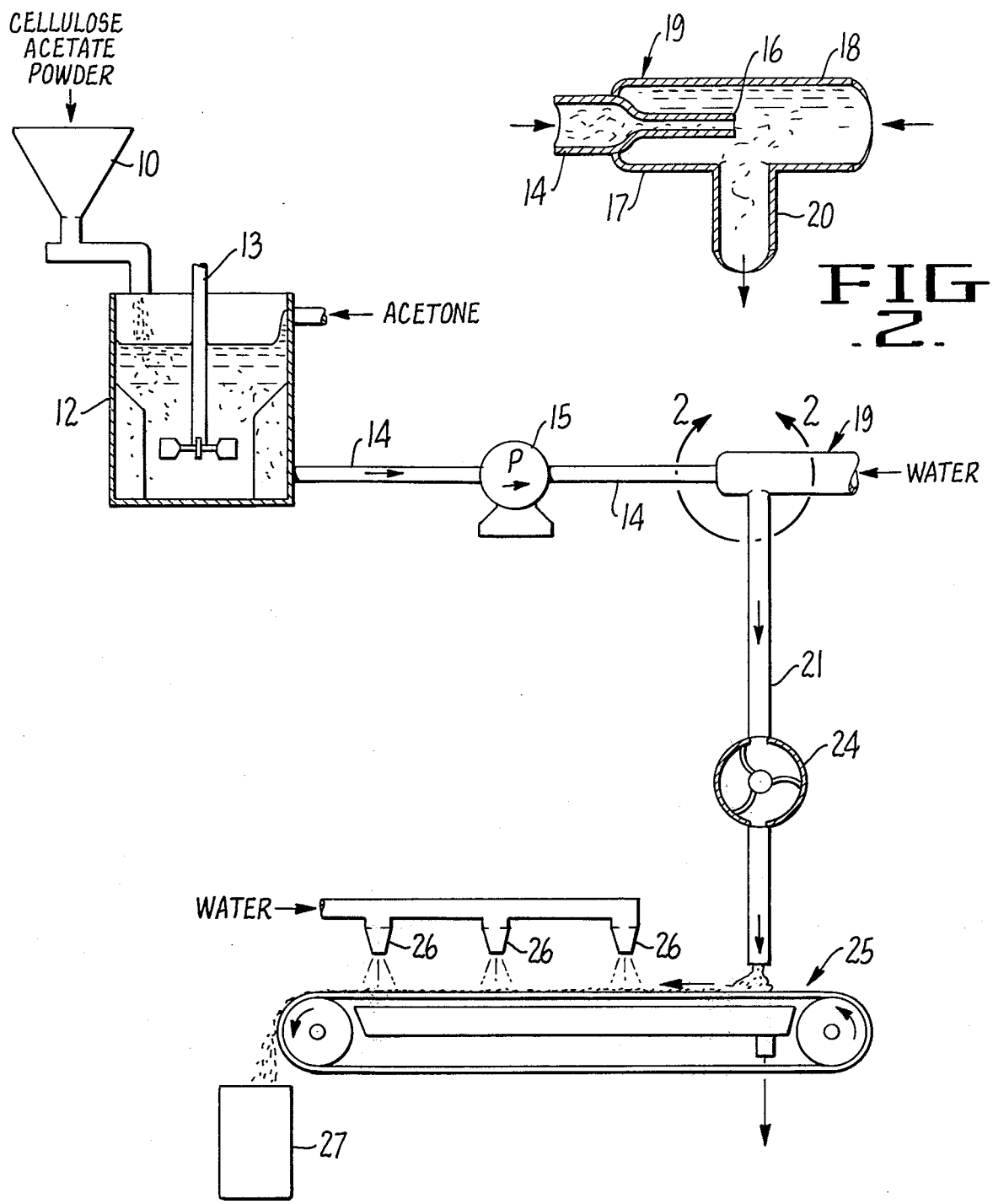

CONTINUOUS PROCESS FOR MAKING FIBROUS CELLULOSE ACETATE FILTER MATERIAL

BACKGROUND OF THE INVENTION

1. Field of Invention

This invention relates to a continuous process for making fibrous cellulose acetate which is useful as a filtering medium for filtering liquids.

2. Description of the Prior Art

Copending application Ser. No. 332,640 filed Feb. 15, 1973, which issued as U.S. Pat. No. 3,842,007, Oct. 15, 1974, describes a new form of fibrous cellulose acetate which closely resembles asbestos in its structure and filtering properties. It comprises rod-shaped fibers intermingled with fine fluffy filaments and, like asbestos, it forms a random matrix of fine, fluffy filaments backboned by larger fibrils when it is deposited from an aqueous suspension onto a filter support. The diameters of the fibrils and filaments of this fibrous cellulose acetate range from about 0.5 microns to about 50 microns and the surface area of the dried fibrous mass ranges between about 35 $m^2/g$ and about 55 $m^2/g$ [1].

[1] As measured in accordance with "Determination of Surface Area Adsorption Measurements by a Continuous Flow Method" by F. M. Nelsen and F. T. Eggertsen, Vol. 30, No. 8, Aug. 1958, Analytical Chemistry, pp. 1387–1390.

Prior to the present invention the above described fibrous cellulose acetate was prepared batchwise by mixing a 2 to 4% by weight solution of cellulose acetate of about 25 to 45 secs. viscosity in an organic solvent of intermediate polarity such as acetone, acetic acid, methyl acetate and 1, 4-dioxane with a cellulose acetate precipitant such as water and mechanically dispersing the resulting precipitate slurry until the surface area of the precipitate, measured as a dried fibrous mass, was in the 35 $m^2/g$ to 55 $m^2/g$ range.

The present invention is a continuous process for making the above described fibrous cellulose acetate.

SUMMARY OF THE INVENTION

As indicated above the process of this invention makes fibrous cellulose acetate resembling asbestos in fibrous structure and filtering properties, comprising rod-shaped fibers intermingled with fluffy filaments and having a surface area in the range of about 35 $m^2/g$ and about 55 $m^2/g$. The steps of this process include continuously introducing a cellulose acetate solution and a cellulose acetate precipitant into a precipitation zone simultaneously in a turbulent manner, continuously withdrawing the resulting slurry from the precipitation zone and passing it through a mechanical shearer which shears the precipitate portion of the slurry to a surface area of about 35 $m^2/g$ to about 55 $m^2/g$, depositing the sheared slurry onto a porous support whereby the liquid portion of the slurry is drained from the precipitate and washing the precipitate to remove adsorbed solvent therefrom.

The turbulent manner of introducing the cellulose acetate solution and precipitant into the precipitating zone is achieved by charging them as separate streams, the directions and velocities of which cause substantial turbulence at the point at which they meet within the zone. Such turbulence is necessary to make a precipitate which will form a random matrix of fine fluffy filaments backboned by larger fibrils. The precipitate is formed substantially instantaneous upon collision of said streams and therefore only a very short residence time within the zone is required.

Optionally the precipitation may be carried out in the presence of other insoluble filter materials such as diatomaceous earth, cellulose fiber, mixtures thereof and the like to yield a filter material which is an intimate mixture of fibrous cellulose acetate and the added filter material. Such mixtures have been found to be easier to process and provide better filtration. Specifically, such mixtures may be more easily washed and removed from filter supports. They also may have superior mechanical strength than fibrous cellulose acetate alone and enable faster filtration rates. Also, they may be dried without destroying their filtering properties.

These other filter materials are merely added to the cellulose acetate solution prior to mixing it with a cellulose acetate precipitant. Usually the weight ratio of cellulose acetate to such other materials will range from about 0.5:1 to about 3:1, with a ratio of about 1:1 being preferred.

EXAMPLES AND DESCRIPTION OF THE DRAWINGS

The process of the invention is illustrated in the drawings in which

FIG. 1 is a flow diagram including equipment details and

FIG. 2 is an enlarged sectional view of a portion of said equipment taken along line 2—2 of FIG. 1.

As illustrated in the drawing, cellulose acetate is charged to a hopper 10 equipped with a volumetric feeder (not shown) and thence into a baffled tank 12 equipped with an agitator 13. The cellulose acetate is of the same grade and type as that used in the above described batch process (commercial grade cellulose acetate in powder or flake form of 25 to 45 secs. viscosity[2], preferably having an acetyl content between about 37% and 40% by weight). Acetone or another organic solvent of intermediate polarity such as those useful in the batch process is also charged to tank 12 in an amount sufficient to make about a 2% to about 4% by weight solution of cellulose acetate, preferably about 3% by weight. This solution is continuously pumped from the bottom of tank 12 out line 14 by a pump 15. The exhaust side of line 14 terminates in a restricted orifice 16 (shown enlarged) and feeds into end 17 of cross bar 18 of a mixing T generally designated 19 (also shown enlarged). Orifice 16 is used to increase the velocity of the stream of solution entering the T. Water or other precipitant is fed into the mixing T from the opposite end of cross bar 18 so that it and the stream of solution emerging from orifice 16 collide head on at the juncture of stem 20 and cross bar 18.

[2] Measured by ASTM D1343-69.

The temperature of the water and solution are generally not critical. Ambient temperatures have been successfully used for both streams. High temperatures i.e. above about 80°C should be avoided because they tend to produce a soft precipitate which does not form as good a filter matrix. Ambient temperature for the solution and 40°–50°C for the precipitant (water) are preferred.

The volume ratio of water to solution will generally be in the range of 4:1 and 20:1. Ratios of 12:1 to 18:1 are preferred and a ratio of about 15:1 is particularly preferred.

The velocities of the streams of solution and water must be sufficient to create substantial turbulence within the T. Otherwise the precipitate fibers will be gel-like and unsuitable for use in filtration. As indicated above precipitation of the cellulose acetate occurs instantaneously as the solution stream and water stream collide with the mixing T. The resulting slurry of cellulose acetate in acetone/water flows out of the T via stem 20 into line 21 and through a three blade impeller 24 which shears the precipitate to the desired surface area. Said slurry is then deposited onto a moving belt filter, generally designated 25, or other porous support such as a drum filter, with the precipitate remaining on the belt and the unadsorbed portion of the liquid component of the slurry draining off through the belt.

The precipitate is washed with an overhead spray of water from nozzles 26 to remove substantially all the adsorbed acetone therefrom and is deposited from the end of the belt into a container 27. As is the case with cellulose acetate produced batchwise, the cellulose acetate of this invention must also be stored in a wet state, i.e. wet with at least about 70% nonsolvent such as water.

EXAMPLE 1

Fibrous cellulose acetate was prepared using equipment which in all material respects was functionally equivalent to that shown in the drawing and described above as follows.

A gallon of a 3% by weight solution of cellulose acetate (Eastman Kodak, 38.3% by weight acetyl, 40 secs. viscosity) in acetone was prepared. This solution was pumped at ambient temperature by a positive displacement pump into a 9.5 mm I.D. glass mixing tee through a 2 mm I.D. glass tube at a mean velocity of 2.6 ft/sec. Water at 48°C was introduced into the T through a 9.5 mm I.D. plastic tube at a mean velocity of 1.68 ft/sec. At this water:solution volume ratio (approx. 15:1) the temperature of the resulting mixture did not decrease more than 1°C. Cellulose acetate precipitated instantaneously as the solution stream contacted the water stream. The precipitate slurry flowed out through the stem of the mixing T and into a 3500 rpm centrifugal pump with a 3 blade impeller, (6.4 cm. diameter-flow through the pump was opposite normal flow so that the blades acted as shearing means). The sheared slurry was collected on a 60–100 mesh screen and the precipitate was washed with water at 48°C until it was acetone free.

The washed precipitate was tested as a filter medium using the following procedure. A standard turbidity curve was prepared by filtering 100 ml hazy dry white wine through a 0.1 micron Millipore membrane filter, adding various amounts (0 to 5.4 ppm) of $SiO_2$ to aliquots of the filtrate, measuring the turbidity of the $SiO_2$ containing aliquots with a Monitek Laboratory Turbidimeter and plotting the results (turbidity v. ppm $SiO_2$).

A suspension of the cellulose acetate in the same wine was prepared and coated into a 3.8 cm diameter filter pad such that each cm² contained $4.7 \times 10^{-3}$ g fibrous cellulose acetate. The same wine was filtered through this pad and the turbidity of the filtrate was observed visually and measured as above and compared to the standard curve. The filtrate was clear and its turbidity was equivalent to less than 0.1 ppm $SiO_2$.

EXAMPLE 2

The effect of water velocity on the precipitate was investigated by repeating the procedure of Example 1 but using varying water velocity. Table I reports the results of this investigation.

Table I

| Water velocity (ft/sec) | Effect of water velocity on cellulose acetate precipitate | |
|---|---|---|
| | Type of fiber | Turbidity of filtrate (as ppm $SiO_2$) |
| 0.42 | gel-like | filter pad clogged |
| 0.84 | gel-like | filter pad clogged |
| 1.26 | gel-like | filter pad clogged |
| 1.64 | fine & fluffy | 0.1 |

EXAMPLE 3

The effect of water temperature on the precipitate was investigated by repeating the procedure of Example 1 but introducing water of varying temperature into the mixing T. Table II reports the results of these investigations.

Table II

| Water Temp.(°C) | Effect of water temperature on cellulose acetate precipitate | | |
|---|---|---|---|
| | Type of fiber | Turbidity of filtrate (as ppm $SiO_2$) | Turbidity of filtrate (visual) |
| 27 | linear | 0.1 | hazy |
| 35 | fine & fluffy | 0.1 | clear |
| 41 | fine & fluffy | 0.1 | clear |
| 49 | fine & fluffy | 0.1 | clear |
| 59 | fine & fluffy | 0.1 | clear |
| 80 | very soft, but acceptable | 0.1 | clear |

The results of Example 2 show that stream velocities which produce great turbulence within the T must be used. It will be understood that the minimum water velocity at which such turbulence is achieved may vary with the water temperature, the diameters of the pipes introducing the solution and water into the mixing T and the velocity of the solution.

The results of Example 3 indicate that low temperatures, i.e. below about 30°C, and high temperatures, i.e. above about 80°C, may result in fibers which provide poor filtering media.

EXAMPLE 4

A gallon of a 3% by weight acetone solution of cellulose acetate was prepared as in Example 1. 0.25 lb. of cellulose fibers was added to the solution and precipitation was effected as in Example 1. The resulting mixture of precipitated fibrous cellulose acetate the cellulose fibers was more porous than fibrous cellullose acetate alone, making the water wash of the sheared slurry easier.

The fibrous cellulose acetate-cellulose fiber mixture was used to filter liquids and found to provide a 15 to 30% increase in filtration rate over fibrous cellulose acetate alone without any decrease in the quality of the filtration. Also, it was easier to remove from the filter support than fibrous cellulose acetate alone and it could be handled and dried without cracking or breaking.

The cellulose acetate prepared by the process of the invention may be used as a filter medium for filtering potable liquids such as fruit juice, vegetable juice and wine in the same manner that the material made by the batch process is used. In such use it is taken from its stored form, e.g., a wet cake, and dispersed in a small amount of the liquid to be filtered with stirring. As indicated above, if it is precipitated with certain other filter materials, it may be stored dry rather than as a wet cake. The dispersed cellulose acetate is coated onto a suitable filter support such as wire screen, cloth, paper or porous ceramic from the dispersion by pouring the dispersion uniformly over the support. The amount used will usually be approximately 24 g. (dry weight) per square ft. in most instances. The liquid that drains from the coated support (liquid to be filtered contaminated with the nonsolvent in which the cellulose acetate is stored) is discarded and filtration proceeds as usual. If desired the cellulose acetate of this invention may be reused by peeling it off the filter support, suspending it in water with agitation, allowing the precipitate to settle and siphoning off the hazy liquid. It is estimated that 70–80% of the solid contaminants may be removed in this manner. If further purification is desired the cellulose acetate may be redissolved in acetone, the solution filtered and the cellulose acetate precipitated from the filtrate.

Modifications of the above described invention which are obvious to those of ordinary skill in the chemical process art are intended to be within the scope of the following claims.

We claim:

1. A continuous process for making fibrous cellulose acetate resembling asbestos in fibrous structure and filtering properties, comprising rod-shaped fibers intermingled with fluffy filaments and having a surface area of about 35 $m^2/g$ to about 55 $m^2/g$ comprising:
   a. generating a solution of cellulose acetate in an organic solvent of intermediate polarity, the viscosity of said cellulose acetate being in the range of about 25 secs. to about 45 secs. and the concentration of said cellulose acetate in said solution being from about 2% to about 4% by weight;
   b. simultaneously introducing into a precipitation zone a stream of said solution and a stream of a cellulose acetate precipitant in a manner yielding turbulence and head on collision of said streams in said zone, the volume ratio of said precipitant to said solution being in the range of about 4:1 to about 20:1;
   c. continuously withdrawing the resulting slurry from said precipitation zone and passing said slurry through a shearing means whereby the precipitate portion of said slurry is sheared to a surface area in the range of about 35 $m^2/g$ to about 55 $m^2/g$;
   d. continuously depositing the sheared slurry onto a porous support whereby the liquid portion of the slurry is drained from the precipitate portion thereof; and
   e. washing said precipitate portion with a nonsolvent for cellulose acetate.

2. The process according to claim 1 wherein said precipitation zone is a T-shaped vessel into which said solution is introduced through one side of the crossbar portion of said T-shaped vessel and said precipitant is introduced through the other side of said crossbar, the combined velocities of flow of said solution and said precipitant being sufficient to cause substantial turbulence at the juncture of said solution and precipitant within said vessel.

3. The process according to claim 1 wherein said organic solvent of intermediate polarity is acetone, said precipitant is water and said nonsolvent for cellulose acetate is water.

4. The process according to claim 1 wherein said precipitant is water having a temperature in the range of about ambient temperature and 80°C and said nonsolvent for cellulose acetate is water at ambient temperature.

5. The process according to claim 1 wherein said precipitant is water having a temperature in the range of about 40°C to about 50°C.

6. The process according to claim 1 wherein the volume ratio of precipitant to solution is in the range of about 12:1 to 18:1.

7. The process according to claim 1 wherein the volume ratio of precipitant to solution is about 15:1.

8. The process according to claim 1 wherein said solution and precipitant are introduced into a mixing tee at velocities which create substantial turbulence within the tee, said organic solvent is acetone, said precipitant is water at 40° to 50°C, the concentration of cellulose acetate in said solution is about 3% by weight, the volume ratio of water to solution is between about 12:1 to 18:1 and said nonsolvent for cellulose acetate is water.

9. The process according to claim 1 wherein said solution contains an insoluble filter material, the weight ratio of cellulose acetate to said insoluble filter material being about 0.5:1 to about 3:1.

10. The process according to claim 9 wherein said weight ratio is about 1:1.

11. The process according to claim 9 wherein said insoluble filter material is cellulose fibers, diatomaceous earth or mixtures thereof.

* * * * *